United States Patent Office 2,832,943
Patented Apr. 29, 1958

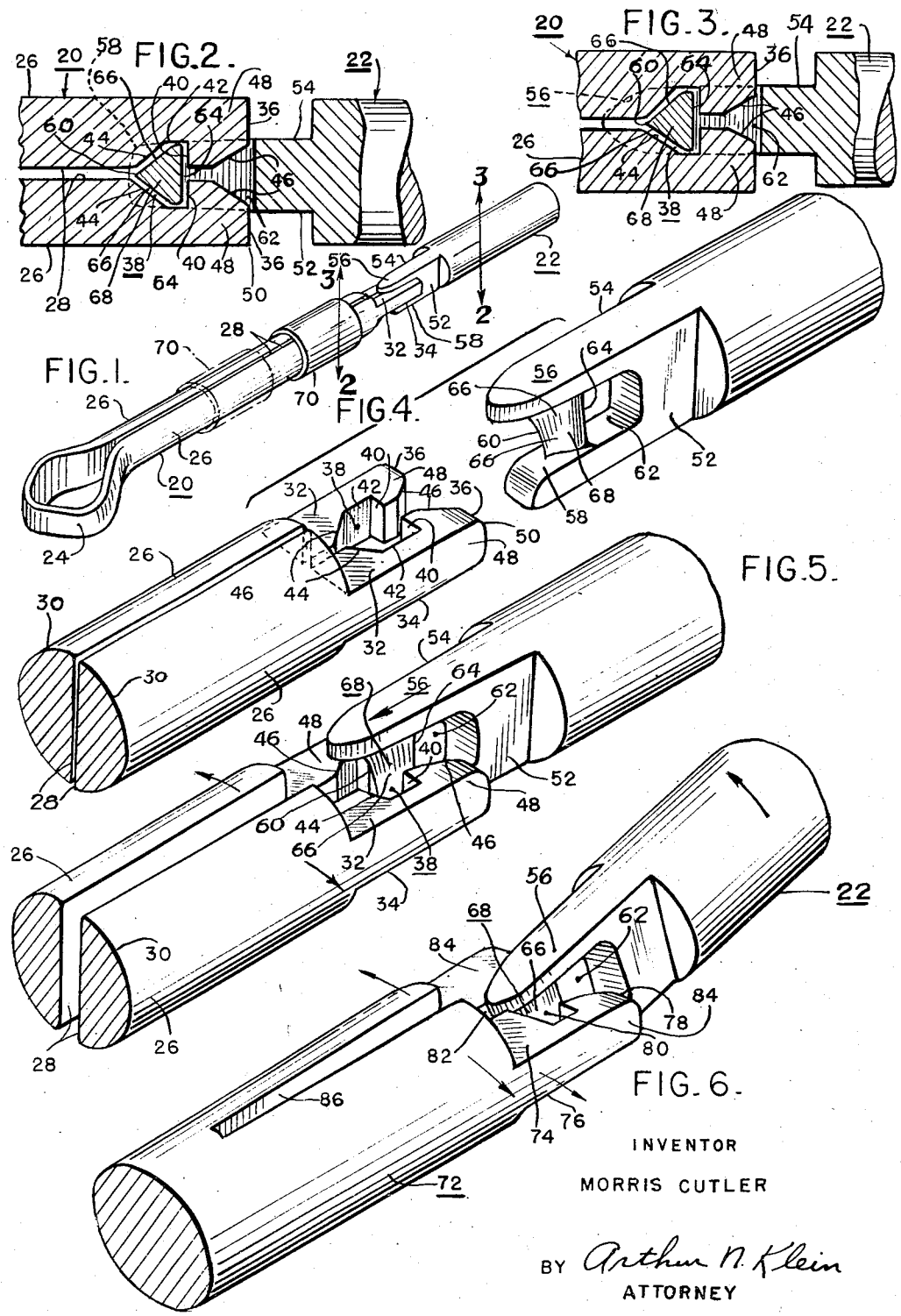

2,832,943

DETACHABLE COUPLING

Morris Cutler, Philadelphia, Pa.

Application December 9, 1954, Serial No. 474,096

5 Claims. (Cl. 339—252)

The present invention relates generally to detachable couplings or connectors and this application is a continuation-in-part of my co-pending application Serial No. 302,433, filed August 2, 1952, now Patent No. 2,701,152, granted February 1, 1955.

An object of the present invention is to provide a new and improved construction for a detachable coupling or connector. Another object of the present invention is to provide a novel coupler or connector made up of a male element and a female element which can be readily interconnected, by direct pressure, in aligned co-planar relationship, wherein they are locked against relative movement except for relative tilting motion in a predetermined plane which causes disconnection of the two elements; a separate adjustable locking-member serving to prevent the last-mentioned disconnecting relative tilting motion.

Other objects and advantages of the present invention are apparent in the following detailed description, appended claims and accompanying drawings.

In my above-mentioned co-pending application Serial No. 302,433, I have disclosed a detachable coupling made up of a male coupler element and a female coupler element having opposed gripping jaws; the two elements being interconnected by direct longitudinal pressure causing the jaws of the female coupler element momentarily to spread apart and thereafter to snap into locking engagement within a hole formed in the male coupler element. When so interconnected, the two elements can be detached by relative tilting motion in a given direction within a predetermined plane; the two elements being capable of free pivotal movement in other directions and planes without disconnection.

According to the present invention, I have perfected a further improved construction which gives a more secure interlock between the two elements and prevents relative pivotal movement in said other directions and planes and which includes a separate adjustable locking-member which can be set so as to prevent the disconnecting tilting motion of the two elements.

For the purpose of illustrating the invention, there are shown in the accompanying drawings forms thereof which are presently preferred and which have been found in practice to give satisfactory results; it being understood, however, that the invention is not limited to the precise arrangements and instrumentalities shown, and that the several parts and elements can be variously arranged and organized without departing from the spirit or essential attributes of this invention.

Referring to the accompanying drawings, in which like reference characters indicate like parts throughout:

Figure 1 is a perspective view of the two part detachable coupling of this invention, shown in interconnected position.

Figure 2 is a fragmentary enlarged cross-sectional view looking generally in the direction of the arrows 2—2 in Fig. 1.

Figure 3 is a view like that of Fig. 2, but looking generally in the opposite direction.

Figure 4 is a fragmentary enlarged perspective view showing the male and female coupler elements of Fig. 1 in disengaged position, but ready for interconnection by direct pressure.

Figure 5 is a view like that of Fig. 4, but showing the coupler elements as they appear during the course of the interconnecting operation, with the jaws of the female element momentarily distended and ready to snap into place within the hole of the male element.

Figure 6 is a fragmentary enlarged perspective view of a modified embodiment, with the coupler elements shown as they appear during the course of the disconnecting operation; the jaws of the female element having been distended by the camming finger of the male element.

In Figs. 1 to 5, I have shown a detachable coupling made up of an elongated female coupler 20 and a male coupler 22.

In this embodiment, the female coupler 20 is formed of steel or other suitable resilient material and generally resembles a cotter-pin in configuration, with a spring loop 24 at one end from which extend a pair of elongated arms 26 disposed in side-by-side and slightly outwardly diverging relationship. The female coupler 20 may be formed of half-round stock, so that the arms 26 have confronting generally plane inner surfaces 28 and convex generally semi-cylindrical outer surfaces 30, as best shown in Fig. 4. Disregarding the slight outward divergence of the two arms 26, it can be seen that, together, they form a longitudinally split or bifurcated cylinder. For ease of explanation, it will be assumed that this split lies in a vertical plane.

The ends of the arms 26 are of reduced thickness and will be assumed to lie in a horizontal plane, with generally parallel top and bottom surfaces 32 and 34.

Somewhat inwardly of the outer transverse edges 36 of the arms 26, the surfaces 28 are notched so that they form an enlarged sharp-edged hole 38 extending vertically from the top surface 32 to the bottom surface 34. As best shown in Figs. 2 and 4, these notches are formed by plane generally transverse walls 40 which extend to generally longitudinal walls 42 which, in turn, extend to longitudinally inwardly converging walls 44, so that the hole 38 formed thereby is of non-circular configuration.

Those portions of the surfaces 28 which lie intermediate the hole 38 and the outer transverse edges 36 diverge outwardly as at 46 to provide camming and guide surfaces for the male coupler during engagement, as will be described hereinbelow.

It can be seen that the edges 36 and the walls 46, 40 and 42 together define a pair of opposed undercut spreadable gripping jaws 48 having sharp inner edges and more or less square outer corners 50.

The male coupler 22 is formed of an elongated length of steel or any other suitable material and may be of cylindrical configuration. The end of the male coupler 22 is of reduced thickness and is disposed generally in a plane at right angles to the plane of the end of the female coupler 20 described above. It will be assumed that the reduced end of the male coupler 22 lies generally in a vertical plane, as indicated in Fig. 4. The reduced end is formed by a pair of side walls 52 and 54 which converge slightly longitudinally outwardly and also converge slightly from top to bottom.

An outwardly protruding camming finger 56 is formed at the top of the reduced free end of the male coupler 22. At the bottom of said reduced free end, there is formed a shoulder 58 which protrudes outwardly a shorter distance than the camming finger. The vertically disposed intervening end portion 68 has a somewhat smaller transverse dimension or thickness than the finger 56 and shoulder 58 as best shown in Fig. 4. A thin forward edge 60 is formed on the portion 68 and extends, in a curve, downwardly and inwardly from the tip of the camming finger 56 to a point somewhat inward of the outer edge of the shoulder 58.

Somewhat inward of the edge 60, there is formed a hole 62 which extends horizontally from the wall 52 to the wall 54. While the hole 62 is generally circular, for the most part, its forwardmost portion (that is, the portion closest the forward edge 60) is defined by a chord surface 64 which forms the inner vertical wall of the portion 68 and enables the gripping jaws 48 of the female coupler to fit into the hole 62 in snug, non-tiltable relationship, as best indicated in Figs. 2 and 3.

Outwardly converging camming surfaces 66 extend generally from the chord surface 64 of the hole 62 to the thin forward edge 60, as best shown in Figs. 2 and 4.

It is apparent that, when the male and female couplers are brought together axially, in the manner indicated in Fig. 5, the outwardly diverging surfaces 46 of the female coupler will contact the camming surfaces 66 of the male coupler. When the two coupler elements are then forced together, the camming action exerted by the surfaces 66 causes the gripping jaws 48 to be momentarily spread apart so as to ride over the surfaces 66 and thereafter snap into the hole 62.

The longitudinal dimension of the portion 68 intervening the forward edge 60 and the chord surface 64 is approximately the same as the longitudinal dimension of the hole 38, and the longitudinal dimension of the gripping jaws 48 is approximately the same as that of the hole 62, so that there is secure metal-to-metal contact between the contiguous surfaces of the male and female couplers when in interlocked position, as best indicated in Figs. 2 and 3. This enables the coupling to be used as an electrical connector if desired.

The non-circular character of the holes 38 and 62, the gripping jaws 48 and the intervening portion 68 securely lock the coupler elements against relative rotation or pivotation in a horizontal plane. The bottom shoulder 58 extends laterally somewhat beyond the hole 38, as best shown in Fig. 2, and prevents the male coupler from being pivoted downward (i. e., clockwise) in a vertical plane from the aligned connected position of Fig. 1.

As shown in Figs. 1 and 3, the camming finger 56 and the upper end of the forward edge 60 extend above and inwardly beyond the hole 38 so as to overlie the slit intervening the plane walls 28 of the female coupler. When the male coupler 22 is rotated upward (i. e., counterclockwise) in a vertical plane from the aligned connected position, the edge 60 and the camming finger 56 are forced into the slit so as to spread the gripping jaws (in a manner analogous to that shown in Fig. 6) so as to enable the two coupler elements to be pulled apart and disengaged.

I may provide the female coupler with a longitudinally shiftable locking member or sleeve 70. When the sleeve is positioned near the gripping jaw end of the female coupler, it fits snugly about the bifurcated end and prevents it from being spread apart. Thus, it is impossible to tilt the male coupler to disengaging position, since the sleeve prevents the slit from being distended sufficiently to receive the edge 60 and camming finger. On the other hand, when the sleeve is shifted (from the solid-line position to the dash-dot line position of Fig. 1), the female coupler can be distended to uncoupling position in the manner described above.

With the sleeve 70 in locking position, the two coupler elements are securely locked against tilting or other relative movement in any direction.

Thus, it is apparent that, according to the present invention, it is possible to provide a quick-acting coupling which will hold two parts together in rigid and securely locked relationship, and which, at the same time, can be easily disconnected. Such a connector has countless important applications for industrial and electrical use, for bracelets and necklaces, for safety belts, parachutes, etc. The coupler can be easily and inexpensively fabricated and can be constructed of metal, synthetic resin, wood or any other suitable material, and can be made as strong as needed for virtually any application.

In Fig. 6, there is shown a modified embodiment of the present invention employing a female coupler 72 which is constructed of cylindrical stock (like the male coupler 22) with an end of reduced thickness formed by generally parallel top and bottom walls 74 and 76. Somewhat inward of the outer transverse edge 78, there is formed a hole 80 which extends vertically from the top surface 74 to the bottom surface 76 and is generally similar in shape to the hole 38 described hereinabove. An outwardly diverging slot 82 extends from the hole 80 to the edge 78 so as to form opposed gripping jaws 84, like the jaws 48 described above. To impart the necessary resilience to the jaws 84, I provide an elongated slot 86 intermediate the surfaces 74 and 76 and extending longitudinally an appreciable distance inward from the hole 80.

The operation of this embodiment is the same as that of the embodiment of Figs. 1 to 5. That is, the coupler elements 72 and 22 are connected by direct pressure (the surfaces of the slot 82 riding over the camming surfaces 66 to spread the jaws 84 and to enable the jaws thereafter to snap into the hole 62). The coupler elements are locked against pivotation except in the vertical plane, in the direction of the arrow shown in Fig. 6, which causes the camming finger 56 to enter and spread the slot 86 and thereby distend the gripping jaws to permit disconnection of the coupler elements in a manner similar to that described above. A locking member or sleeve 70 may also be provided for the female coupler 72, its operation being like that described above.

The present invention may be embodied in other specific forms and, accordingly, the above-described embodiments are to be regarded merely as illustrative, and not restrictive, reference being made to the appended claims, rather than the foregoing specification, as indicating the scope of this invention.

Having thus described my invention, I claim as new and desire to protect by Letters Patent the following:

1. A detachable coupling comprising a male coupler having an end portion provided with outwardly tapered camming surfaces terminating in a thin forward or outer edge, a protruding camming finger formed at one end of said forward edge and a protruding shoulder formed at the other end of said forward edge, said intervening tapered end portion having a lesser thickness than the finger and the shoulder, said end portion having a sharp-edged non-circular hole extending transversely therethrough and spaced somewhat longitudinally inward of said forward edge; and a female coupler having an end portion bifurcated by a slot extending longitudinally inward from the transverse forward or outer edge thereof, said slot being notched out at a point spaced somewhat longitudinally inward of said forward edge so as to provide a sharp-edged non-circular hole extending through said end portion and providing a pair of undercut opposed resilient gripping jaws at said forward edge, the inward spacing of the holes in the male and female couplers being generally the same; said male and female couplers being attachable by bringing their forward edges together in 90 degree axially rotated position so that the thin forward edge of the male coupler fits against the end of the slot of the female coupler and by thereafter forcing the couplers longitudinally toward each other so as to cause the camming surfaces of the male coupler to enter and distend the slot of the female coupler thereby to spread the gripping jaws until they pass over the intervening portion of the male coupler and snap together snugly within the male coupler hole, the aforesaid intervening portion of the male coupler being positioned snugly within the non-circular hole of the female coupler, whereby the two couplers are securely interconnected in co-axial aligned relationship and are locked against separation by longitudinal pulling force and are also locked against relative lateral movement and against pivotation in the plane of the gripping jaws, the protruding shoulder of the male coupler having a greater transverse dimension than the contiguous portion of the female coupler slot so as to prevent pivotation in one direction in the plane normal to the plane of the gripping jaws, pivotation in the opposite direction in the aforesaid normal plane causing the camming finger to enter and distend the slot of the female coupler so as to spread the gripping jaws and to permit disengagement of the couplers.

2. A construction according to claim 1 wherein the female coupler is provided with a snugly fitting locking sleeve which can be shifted axially along the female coupler and, when positioned adjacent the gripping jaws, serves to prevent them from being spread apart, thereby locking the couplers against disengagement and maintaining them against pivotation in any direction from their co-axial aligned relationship.

3. A construction according to claim 1 wherein the female coupler is shaped generally like a cotter-pin with a spring loop at one end from which extend a pair of elongated side-by-side arms forming the bifurcated end portion.

4. A construction according to claim 1 wherein the female coupler is for the most part unslotted with the bifurcating slot extending inward only along the end portion.

5. A construction according to claim 1 wherein the couplers are formed of electrically conducting metal or the like so that the coupling can be used as a quick attachable and detachable electrical connector.

References Cited in the file of this patent

UNITED STATES PATENTS

| | | |
|---|---|---|
| 717,371 | Faulkner | Dec. 30, 1902 |
| 1,550,828 | Lonsdale | Aug. 25, 1925 |
| 2,441,921 | Reynolds | May 18, 1948 |
| 2,701,152 | Cutler | Feb. 1, 1955 |